United States Patent
Moncivais-Pinedo

(10) Patent No.: US 12,242,518 B2
(45) Date of Patent: Mar. 4, 2025

(54) ENHANCED PROCESSING OF LARGE DATA VOLUMES FROM INSIDE RELATIONAL DATABASES

(71) Applicant: Level 3 Communications, LLC, Broomfield, CO (US)

(72) Inventor: Idilio Moncivais-Pinedo, Broomfield, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

(21) Appl. No.: 18/493,295

(22) Filed: Oct. 24, 2023

(65) Prior Publication Data

US 2024/0134889 A1 Apr. 25, 2024
US 2024/0232235 A9 Jul. 11, 2024

Related U.S. Application Data

(60) Provisional application No. 63/380,887, filed on Oct. 25, 2022.

(51) Int. Cl.
 *G06F 16/28* (2019.01)
 *G06F 16/2458* (2019.01)

(52) U.S. Cl.
 CPC .................. *G06F 16/288* (2019.01)

(58) Field of Classification Search
 CPC .................. G06F 16/288; G06F 16/2462
 See application file for complete search history.

(56) References Cited

U.S. PATENT DOCUMENTS

| | | | |
|---|---|---|---|
| 6,477,612 B1 * | 11/2002 | Wang | G06F 12/1027 711/2 |
| 11,811,962 B2 * | 11/2023 | Vaananen | G06N 3/045 |
| 2002/0091680 A1 * | 7/2002 | Hatzis | G16H 20/10 |
| 2005/0228727 A1 * | 10/2005 | King | G06Q 40/04 705/30 |
| 2009/0165021 A1 * | 6/2009 | Pinkston | G06F 9/546 719/314 |
| 2016/0191210 A1 * | 6/2016 | Hirano | H04L 1/08 714/748 |
| 2019/0180358 A1 * | 6/2019 | Nandan | G06F 18/2113 |
| 2021/0217525 A1 * | 7/2021 | Sanduleanu | G06T 7/0012 |
| 2021/0357519 A1 * | 11/2021 | Cobb | G06F 21/6218 |
| 2024/0310889 A1 * | 9/2024 | Kaburlasos | G06F 1/3234 |

* cited by examiner

*Primary Examiner* — Etienne P Leroux

(57) ABSTRACT

This disclosure describes systems, methods, and devices related to analyzing data stored in a relational database. A method may include installing a structured query language (SQL) server on a host server; installing statistical analysis modules on the host server; executing the statistical analysis modules within a relational database of the SQL server to analyze data stored in the relational database; and generating outputs based on the execution of the statistical analysis modules within the relational database.

14 Claims, 6 Drawing Sheets

ENHANCED PROCESSING OF LARGE DATA VOLUMES FROM INSIDE RELATIONAL DATABASES

CROSS-REFERENCE TO RELATED APPLICATION

This application is related to and claims priority under 35 U.S.C. § 119(e) from U.S. Patent Application No. 63/380,887, filed Oct. 25, 2022, titled "ENHANCED PROCESSING OF LARGE DATA VOLUMES FROM INSIDE RELATIONAL DATABASES," the entire content of which is incorporated herein by reference for all purposes.

TECHNICAL FIELD

Embodiments of the present invention generally relate to systems and methods for processing large data volumes in relational databases.

BACKGROUND

To analyze data, particularly large data sets, stored in relational databases, a current practice is to extract the data from the relational databases and import the extracted data to applications that perform analytics on the data. Another current practice is to use an interface to connect to the relational databases to obtain the data for analysis. Such existing techniques may be limited in the amount of data that they can import, and may use suboptimal drivers to connect to the relational databases.

SUMMARY

A method for analyzing data stored in a relational database may include: installing a structured query language (SQL) server application on a host server; installing statistical analysis modules on the host server; executing the statistical analysis modules within a relational database of the SQL server application to analyze data stored in the relational database; and generating outputs based on the execution of the statistical analysis modules within the relational database.

A system for analyzing data stored in a relational database may include memory coupled to at least one processor of a host server, the at least one processor able to: install a structured query language (SQL) server application on the host server; install statistical analysis modules on the host server; execute the statistical analysis modules within a relational database of the SQL server application to analyze data stored in the relational database; and generate outputs based on the execution of the statistical analysis modules within the relational database.

A non-transitory computer-readable storage medium may include instructions to cause at least one processor of a device for analyzing data stored in a relational database, upon execution of the instructions by the at least one processor, to: install a structured query language (SQL) server application on a host server; install statistical analysis modules on the host server; execute the statistical analysis modules within a relational database of the SQL server application to analyze data stored in the relational database; and generate outputs based on the execution of the statistical analysis modules within the relational database.

DETAILED DESCRIPTION

Figure 1:
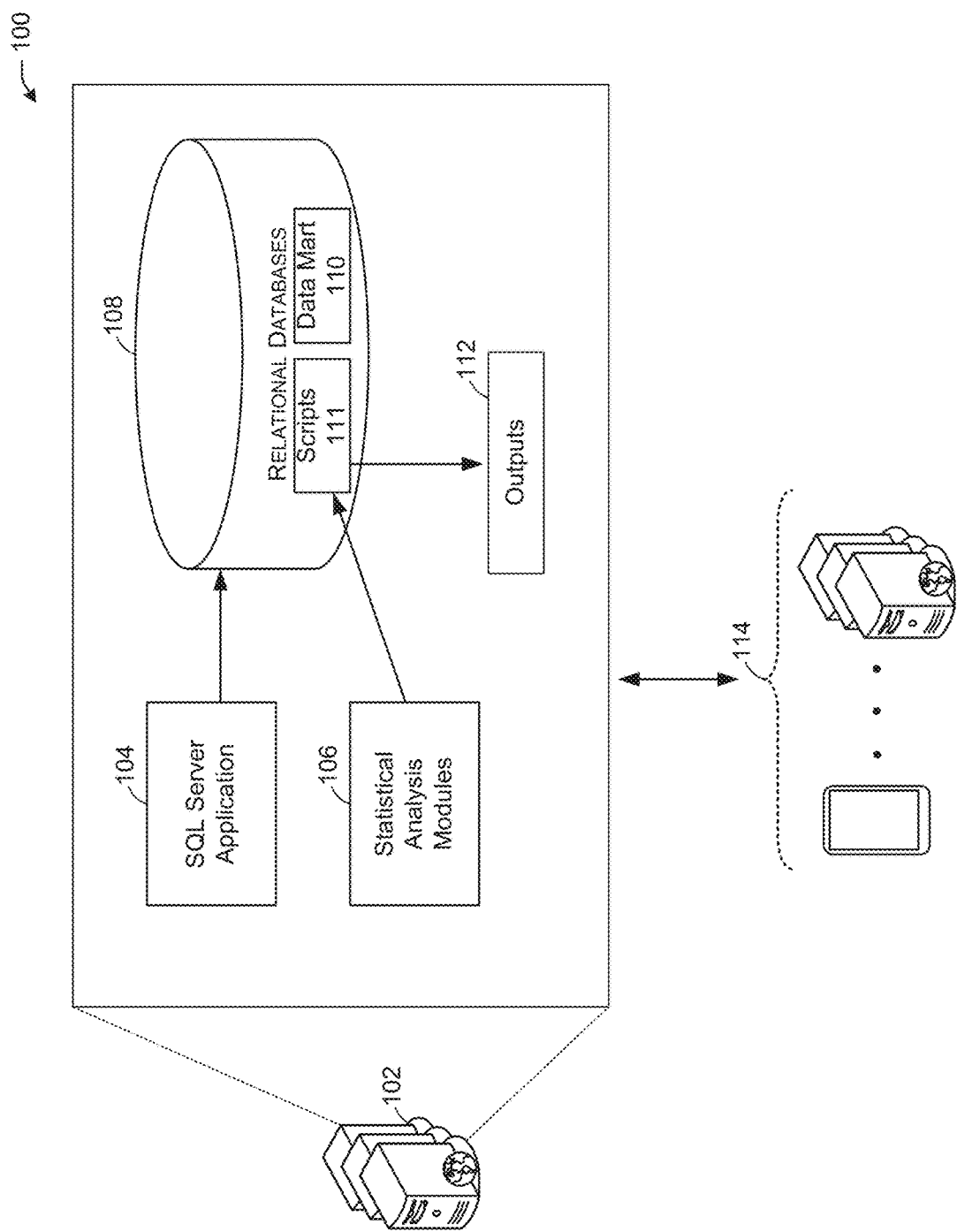
FIG. 1 illustrates an example system for processing large data volumes in relational databases in accordance with one embodiment.

Aspects of the present disclosure involve systems, methods, and the like, for enhanced processing of large data sets from inside relational databases.

Relational databases may be used to store large volumes of data that are related to one another. Relational databases are based on a relational model in which each row of a table is a record with a key (e.g., unique identifier), and the columns of the table include attributes of the data.

Large corporations use "Enterprise Resource Systems" (ERP) computer systems to manage most of their, day to day, financial operations like: General Accounting, Financial Planning, Accounts Payable, Accounts Receivable, Capital Management, Purchasing, Inventory, Human Resources, Payroll, etc. Large ERPs manage data, but provide little analysis capabilities.

ERP data is usually stored in large Relational Database Management Systems (RDBMS). The data is then managed and presented to the end user through the vendor's own graphical user interface (GUI) and distributed by various reporting applications. RDBMS data may be consumed by users through a GUI and distributed by reporting applications. Reports come from a replica of the data and are generated by jobs to pre-process data: group, summarize, aggregate, sort, enrich, pivot, integrate with other data sources, etc.

However, existing reporting applications for RDBMS data do not provide the statistical capabilities of a statistical application like R (e.g., the R statistical software language). Neither the GUI nor the reporting systems provide rich statistical analysis. Current practices extract data from large repositories to then import it into statistical applications to run advanced analytics, or use an application programming interface (API) that connects to RDBMS using drivers like open database connectivity (ODBC), which may not always be desirable.

Some existing techniques use statistical applications functional on the edge of or outside of relational databases, but do not take advantage of the power of statistical functionality in direct contact with large data sets as they exist within relational databases.

A goal if the present disclosure is to include statistical analysis of financial data using R scripts embedded into a structured query language (SQL) database. That is, the R scripts can be run natively from within a SQL Server.

In one or more embodiments, a large data set including capital, assets, purchasing, and invoice records may be built and integrated into a capital spend data mart and stored in a SQL server database. R scripts may be used to analyze the data mart and product text and graphical outputs of common R libraries run inside the database along with SQL scripts. For example, the data set may include billions of records for a one-year period of financial operations, and the data mart may include over a million records of aggregated and summarized data. The R scripts may produce a trending spend and forecast budget run rate, for example.

A benefit of utilizing R functions within a RDBMS is that very large volumes of data can be analyzed natively within the database, as opposed to exporting data out of the database that would have to be imported into a statistical application to perform the statistical analysis. Considering the existing unique and differentiating applications of R in the industry, the following application on R (listed in no order) in SQL Server seems probable: Machine Learning, Natural Language Processing, Financial Data Modeling, Bio-informatics data analysis, Network data analysis, Spatial and geo-statistical modeling, Web Scraping and data ingestion, and Statistical Graphics, among others.

In one or more embodiments, a x64 server may be loaded with 32 CPU cores and 64 Gb of RAM in a network used as a host machine. The host machine may have a SQL server installed along with a R server for statistical analysis scripts to analyze the data in the relational databases.

In one or more embodiments, the integration of the R scripts relational databases may produce an integrated data mart of the original source. This integration will collapse the source data "Capital" hierarchy of Programs, Projects, Tasks, Expenditure Headers, Expenditure Line Items, Cost Distribution Headers and Cost Distribution Line Items (CDLI). From this last level of detail, CDLI can be connected into the "Purchasing" hierarchy of Purchase Order Headers, Purchase Order Line Items and Purchase Order Line Items Distributions; and connected with the "Accounts Payable" hierarchy of Invoice Headers, Invoice Line Items and Invoice Line Items Distributions. The integrated and aggregated view can then be used to show some of the most common R functions producing descriptive statistics, charts, plots, standard distributions, analysis of variance, etc., using an aggregated view of the integrated data set for the topic of "Capital Spend."

In one or more embodiments, the present disclosure provides Entity-Relationship Diagrams (ERDs) to illustrate complex relationships between database tables in ERP systems. There are three different types of data models produced while progressing from requirements to the actual database to be used for the information system. The data requirements are initially recorded as a conceptual data model which is essentially a set of technology independent specifications about the data and is used to discuss initial requirements with the business stakeholders. The conceptual model is then translated into a logical data model, which documents structures of the data that can be implemented in databases. Implementation of one conceptual data model may require multiple logical data models. The last step in data modeling is transforming the logical data model to a physical data model that organizes the data into tables, and accounts for access, performance and storage details. Data modeling defines not just data elements, but also their structures and the relationships between them. Data modeling is also used as a technique for detailing business requirements for specific databases. It is sometimes called database modeling because a data model is eventually implemented in a database. This is not, however, a project about data modeling, but the concept is explained herein for context.

In one or more embodiments, the data integration of an eBusiness suite into a data warehouse and then into a reporting data mart may be based on the following process:

(1) A main job control integration solution is scheduled to run when some data replication conditions are met, which will trigger the initiation of its execution. The job control is contained within an "Extract, Transform and Load" (ETL) package named "Master Job Control."

(2) The master job control is controlled by a SQL server agent. The SQL server agent "wakes up" at 10 PM DST (GMT-7), for example, and looks for "semaphores" that indicate that the main eBusiness suite production database is up and running and that it has completed data replication into the backup and reporting instances. If the semaphore conditions are not met, the job agent goes "back to sleep" and "wakes up" every five minutes, to check again, for semaphore conditions. Once semaphore conditions are met, the job agent initiates its execution. The job agent continues to run this loop for a period of up to two hours.

(3) The master job control execution starts by copying the metadata (MD) tables, which are the largest tables (up to 200 million records each). These tables are common to the rest of the eBusiness modules.

(4) When the MD tables data copy is completed, clustered and non-clustered indexes are created to improve further data processing. This data flow finishes by creating pre-calculated and aggregated tables to improve the processing of reporting jobs. After this, the job control bifurcates into two concurrent data flows. One branch to copy Inventory Management (INV) tables and the other branch to copy project management (OPM) tables.

(5) After the INV tables data copy is completed, clustered and non-clustered indexes are created to improve further data processing. This data flow finishes by creating pre-calculated and aggregated tables to improve the processing of reporting jobs. This job control data flow concludes by copying the legacy Clarify Logistics (CCL) tables.

(6) After the OPM tables data copy is completed, clustered and non-clustered indexes are created to improve further data processing. This data flow finishes by creating pre-calculated and aggregated tables to improve the processing of reporting jobs. This job control data flow concludes by copying the Purchasing (PO) tables.

(7) After the CCL tables data copy is completed, clustered and non-clustered indexes are created to improve further data processing. This data flow finishes by creating pre-calculated and aggregated tables to improve the processing of reporting jobs. This is the end of this branch of the job control.

(8) After the PO tables data copy is completed, clustered and non-clustered indexes are created to improve further data processing. This data flow finishes by creating pre-calculated and aggregated tables to improve the processing of reporting jobs. This is the end of this branch of the job control.

(9) While the individual components of the "Main Job Control" are being completed, and after the last two branches finish their data processing, a series of "marker" records are inserted into the SQL server logging tables. These log records contain the component name, start/stop date-time stamps, total execution time, number of records processed, and success or failure indicators. The log records are used to report about the overall performance of the ETL process and to looks for opportunities for improvement of the individual data flows.

In one or more embodiments, the data mart creation also may be controlled by a data integration solution. This "package" analyzes and integrates the previously copied eBusiness data within the data warehouse to create many reference fact and dimension tables that are subsequently used to report on Capital Spend.

In one or more embodiments, a main SQL server application may act as a main job control with child processes run based on triggers and business logic. The main job control may start in response to system status, spawn child jobs and their starting/ending points, may direct child job branching, may save individual job statuses into a log, and may send a message at different stages of the process to maintain communications.

In one or more embodiments, a main data mart may be created by a series of SQL scripts run in parallel after the main job control ends, and may perform the following steps for any facts and dimensions tables: Drop table and, in the correct order, any other referential DB objects if they exist; create and populate the main table following business logic; and recreate clustered and non-clustered indexes to improve performance.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for processing large data volumes in relational databases in accordance with one embodiment.

Referring to FIG. 1, the system 100 may include a host server 102 on which a SQL server application 104 may be installed and on which statistical analysis modules 106 may be installed. The SQL server application 104 may have one or more relational databases 108 in which a large data set may be used to generate a data mart 110. The statistical analysis modules 106 may execute inside of the one or more relational databases 108 to analyze the data of the data mart 110 and generate outputs 112 that analyze the data of the data mart 110 without having to extract the data from the one or more relational databases 108 to perform the analysis.

In one or more embodiments, the host sever 102 may be a x64 or larger server loaded with at least 32 processing cores and at least 64 Gb of RAM (e.g., in a Gig-E network) to serve as the host machine for the SQL server application 104 and the statistical analysis modules 106. The statistical analysis modules 106 may include traditional statistical application systems like SPSS, SAS, NVIVO or R. The statistical analysis modules 106 run natively from within objects of the SQL server application 104 such as simple select statements, Stored Procedures, Views and/or Functions. A benefit of utilizing R functions within the one or more relational databases 108 is that very large volumes of data (e.g., in the data mart 110) can be analyzed natively within the one or more relational databases 108, as opposed to exporting data out of the one or more relational databases 108 that would have to be imported into a statistical application to perform the statistical analysis.

In one or more embodiments, a large data set including capital, assets, purchasing, and invoice records may be built and integrated into the data mart 110 and stored in the one or more relational databases 108. R scripts (e.g., the scripts 111) may be used to analyze the data mart 110 and product text and graphical outputs 112 of common R libraries run inside the one or more relational databases 108 along with SQL scripts. For example, the data set may include billions of records for a one-year period of financial operations, and the data mart 110 may include over a million records of aggregated and summarized data. The R scripts 111 may produce a trending spend and forecast budget run rate, for example.

In one or more embodiments, the R scripts 111 may use queries to produce result sets, such as those shown in Tables A-D below:

TABLE A

Simple result set with column headers:

| PERIOD | REGION | PROJECT_TYPE | USD_AMOUNT |
| --- | --- | --- | --- |
| 2018 June | Region 2 | Infrastructure | 775796.25 |
| 2018 June | Region 2 | IP Core | 116170.24 |
| 2018 June | Region 2 | Transport-Longhaul | 129722.6 |
| 2018 June | Region 2 | Transport-Metro | 1800 |
| 2018 June | Region 2 | Voice | 40402 |
| 2018 June | Region 3 | Colocation | 216730.09 |
| 2018 June | Region 3 | Infrastructure | 120.23 |
| 2018 June | Region 3 | Integration | 28207.02 |
| 2018 June | Region 3 | IP | 32153.24 |
| 2018 June | Region 3 | IP Core | 24091.19 |
| 2018 June | Region 3 | IT HW-SW-370 | 574350 |
| 2018 June | Region 3 | Media | 67703.82 |
| 2018 June | Region 3 | MNS-OSP | 2147.12 |
| 2018 June | Region 3 | Transport-Longhaul | 4288.25 |
| 2018 June | Region 3 | Transport-Metro | 52425.84 |
| 2018 June | Region 3 | Voice | 65833.65 |
| 2018 June | Region 1 | Colocation | 1532271 |
| 2018 August | Region 3 | Transport-Longhaul | 154237.7 |
| 2018 August | Region 3 | Voice | 58766.86 |
| 2018 August | Region 1 | Infrastructure | 8272.03 |

TABLE B

Output from the R summary function showing descriptive statistics:

| Field_Num | Field_Name | Statistics |
| --- | --- | --- |
| NULL | PERIOD | 2018-06:36 |
| NULL | PERIOD | 2018-07:40 |
| NULL | PERIOD | 2018-08:15 |
| NULL | REGION | Region 2: 11 |
| NULL | REGION | Region 3: 36 |
| NULL | PROJECT_TYP | IP Core: 6 |
| NULL | PROJECT_TYP | Voice: 6 |
| NULL | PROJECT_TYP | Colocation: 5 |
| NULL | PROJECT_TYP | (Other): 52 |
| NULL | USD_AMOUNT | Min.: 9 |
| NULL | USD_AMOUNT | 1st Qu.: 24527 |
| NULL | USD_AMOUNT | Median: 97769 |
| NULL | USD_AMOUNT | Mean: 1406440 |
| NULL | USD_AMOUNT | 3rd Qu.: 556077 |
| NULL | USD_AMOUNT | Max.: 28584453 |
| NULL | USD_AMOUNT | NULL |

TABLE C

Output from FiveNum( ) function showing descriptive statistics:
FiveNumUSDamt 83,301,919.76
84,928,608.20
103,545,077.47

TABLE C-continued

Output from FiveNum( ) function showing descriptive statistics:
FiveNumUSDamt 119,872,169.92
132,877,632.57

TABLE D

Capital Spend by Period, Region and Type:

| PERIOD | REGION | PROJECT_TYP | USD_AMOUNT |
|---|---|---|---|
| 2017 July | Region 2 | Colocation | 1,294,257.93 |
| 2017 July | Region 2 | Infrastructure | 3,749,934.18 |
| 2017 July | Region 2 | IP | 169,776.50 |
| 2017 July | Region 2 | IP Core | 494,630.55 |
| 2017 July | Region 2 | IT HW-SW-370 | 462,894.35 |
| 2017 July | Region 2 | Media CDN | 1,243,867.29 |
| 2017 July | Region 2 | MNS-OSP | 1,078,613.08 |
| 2017 July | Region 2 | OSP-Relocation | 459,012.81 |
| 2017 July | Region 2 | Real Estate | 125,867.46 |
| 2017 July | Region 2 | Regional Physical Security | 19,556.27 |
| 2017 July | Region 2 | Sub Sea Augments | 17,419.07 |
| 2017 July | Region 2 | Transport-Longhaul | 291,702.11 |
| 2017 July | Region 2 | Transport-Metro | 975,083.35 |
| 2018 June | Region 1 | Supply Chain Management | 11,000.00 |
| 2018 June | Region 1 | Transport-Longhaul | 13,132,884.78 |
| 2018 June | Region 1 | Transport-Metro | 493,349.30 |
| 2018 June | Region 1 | Voice | 2,191,685.65 |

Figure 2:
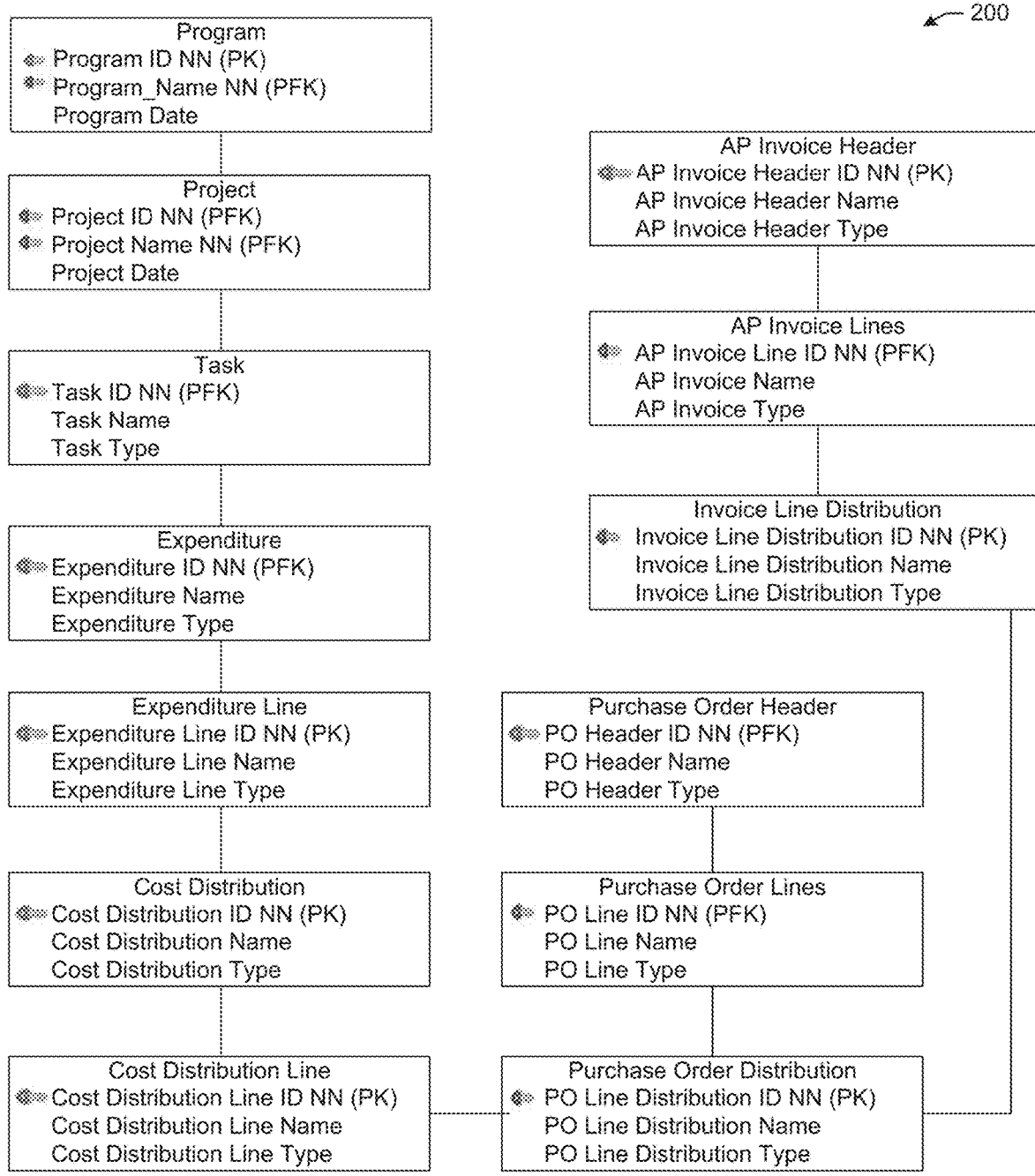
FIG. 2 shows example Entity-Relationship Diagrams (ERDs) linked together for processing large data volumes in relational databases in accordance with one embodiment.

FIG. 2 shows example Entity-Relationship Diagrams (ERDs) 200 linked together for processing large data volumes in relational databases in accordance with one embodiment.

Referring to FIG. 2, the ERDs 200 may include a simplified representation of a logical data model using table names and relationships. The hierarchy starts with a capital program where funds are allocated for a given key initiative at the corporate level. After the capital program is a capital project with a finite budget, start and end dates, and scope. After the capital project is a task, which is a defined, homogeneous unit of work that can be assigned to an individual or team. Tasks have ledger expenditures in which expenses are accounted for in a profit and loss statement, for example. Expenditures can have line items to account for different levels of detail that can be in separate general ledger accounts. Expenditure line items can be broken down into cost distribution line items to be assigned to journal entries. Cost distribution line items are the lowest level of detail and equal to one with journal entries or journal batches.

Still referring to FIG. 2, the ERDs 200 may include a supply chain management ERD with emphasis on purchasing tables. For example, purchase orders are vendor specific and have line items in which individual items are described in terms of make, model, price, unit of measure, quantity, and the like. Purchase order lines have corresponding distribution records where the cost may be allocated to general ledger accounts that can be matched to cost distribution line item (CDLI) records. The ERDs 200 also may include an ERD for accounts payable modules with emphasis on invoice tables. Invoices are received from vendors for services and goods received, and processed for payment. Invoices have line items where individual items are described in terms of make, model, price, unit of measure, quantity, and the like. Invoice lines have corresponding distribution records where the payments are allocated to general ledger accounts that can be matched to CDLI records.

As shown in FIG. 2, the combined data model of the ERDs 200 allows for joining and traversing data from capital ERDs to purchasing ERDs, enabling data integration. Relating the model in this manner is what enables the statistical analysis modules 106 of FIG. 1 to analyze data from capital to purchasing to invoicing, thereby showing money budgeted, committed, and submitted, and allowing the statistical analysis modules 106 to produce advanced analytics using statistical functions with a reduced data model that can be grouped and summarized at the most significant levels of detail.

Figure 3:
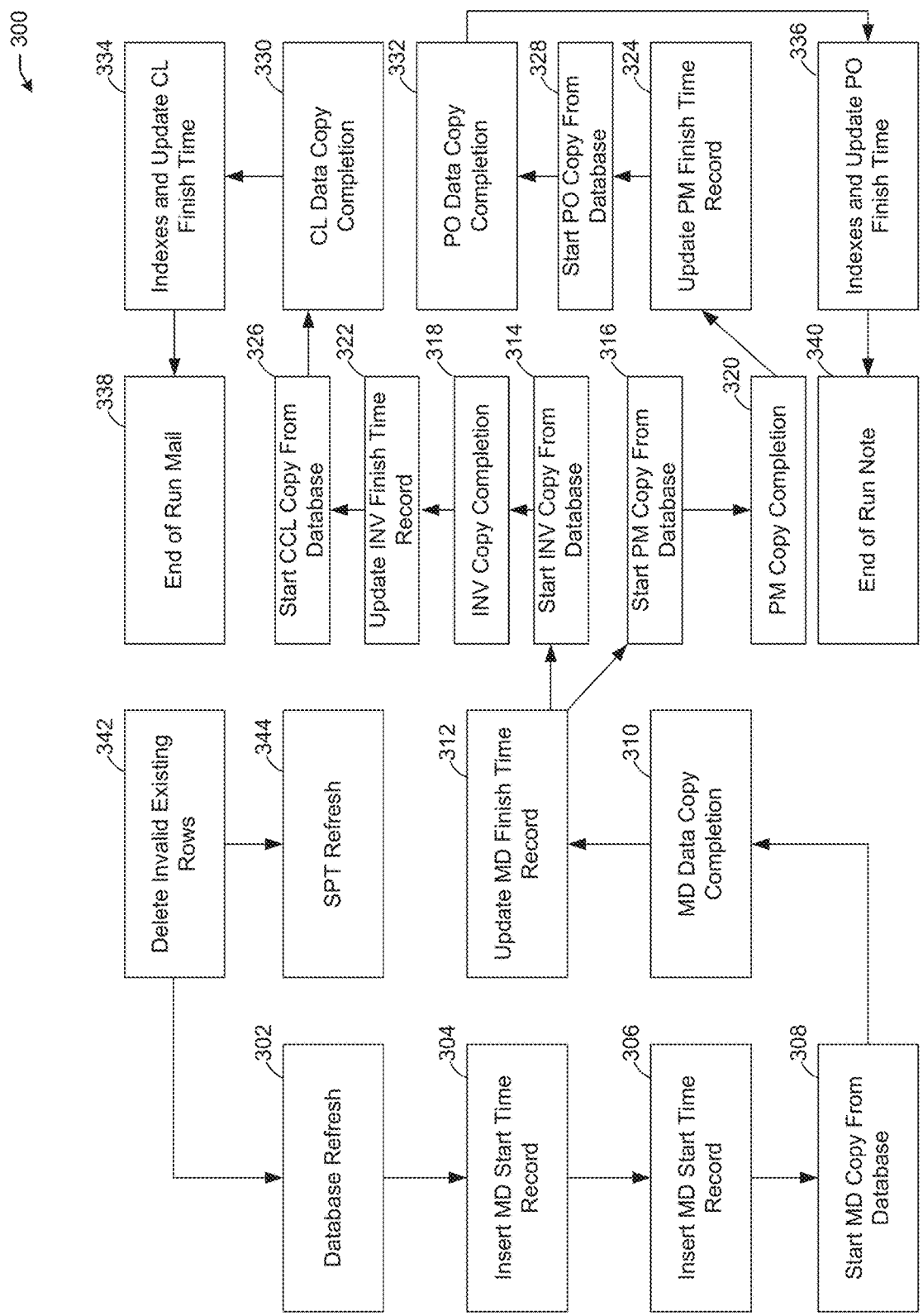
FIG. 3 shows an example extract, transform, and load process for processing large data volumes in relational databases in accordance with one embodiment.

FIG. 3 shows an example extract, transform, and load process 300 for processing large data volumes in relational databases in accordance with one embodiment.

Referring to FIG. 3, the process 300 may include an a database refresh 302 in which the host server 102 of FIG. 1 may check the database for completion of the refresh until the refresh has completed. After the database refresh 302, the host server 102 may insert a MD start time record 304 (e.g., "MD" referring to a main database). Then the host server 102 may start a MD copy 306 from the database. Then the host server 102 may check the MD until the MD data copy has completed 310. When the MD data copy has completed, the host server 102 may update the MD finish time record 312. Once the MD finish time record 312 has been updated, the host server 102 may start an INV (inventory) copy 314 from the database and may start a PM (process manufacturing) copy 316 from the database. The INV copy completes at 318, and the PM copy completes at 320. After the INV copy completes 318, the host server 102 may update the INV finish time record 322. After the PM copy completes, the host server 102 may update the PM finish time record 324. The host server 102 may start a CL (command language) copy 326 from the database. The host server 102 may start a PO (purchase order) copy 328 from the database. The CL data copy completes at 330. The PO data copy completes at 332. After the CL data copy completion 330, the host server 102 may index and update the CL finish time 334. After the PO copy completion 332, the host server 102 may index and update the PO finish time 336. After indexing and updating the CL finish time 334, the run mail ends 338. After indexing and updating the PO finish time 336, the run note ends 340. The host server 102 also may delete invalid existing rows of the database at 342, which may be provided to the database refresh 302 and to a SPT (shortest process time) refresh 344. After the SPT refresh 344, a database copy of very large objects may begin.

Still referring to FIG. 3, a main SQL server integration services (SSIS) application (e.g., of the SQL server application 104 of FIG. 1) may acts as a main job control (MJC). It has child processes that are run based on triggers and business logic. MJC starts in response to system status. MJC spawns child jobs, their start/end points, and directs job branching. MJC saves individual jobs status into a log. MJC sends email communication at several stages of the process to maintain communications.

In one or more embodiments, the data mart 110 of FIG. 1 is created by a series of SQL scripts (e.g., of the SQL server application 104) run in parallel right after the MJC ends. It performs these steps for all Facts and Dimension tables: Drop table and, in the correct order, any other referential DB objects if they exist. Create and populate the main table following business logic. Recreate clustered and non-clustered indexes to improve performance.

Figure 4:
FIG. 4 shows an example extract, transform, and load process used to integrate previously copied data tables into an aggregated data mart for processing large data volumes in relational databases in accordance with one embodiment.

FIG. 4 shows an example extract, transform, and load process 400 used to integrate previously copied data tables into an aggregated data mart for processing large data volumes in relational databases in accordance with one embodiment.

Referring to FIG. 4, an insert row 402 command may be used to create multiple PM reports, such as budget versus actuals report 404, calculated accrual report 406, project forecasting report 408, capital spend data mart 410, and change_audit report 412. The Capital spend data mart 410 may represent the main job.

Still referring to FIG. 4, the extract, transform, and load process 400 may include creating the budget versus actual data report 404, creating the calculated accrual data report 406, creating the project forecasting report 408, creating the data mart 110 of FIG. 1 (e.g., the main job using the MJC as described with respect to FIG. 3), and creating the change_audit report 412.

Figure 5:
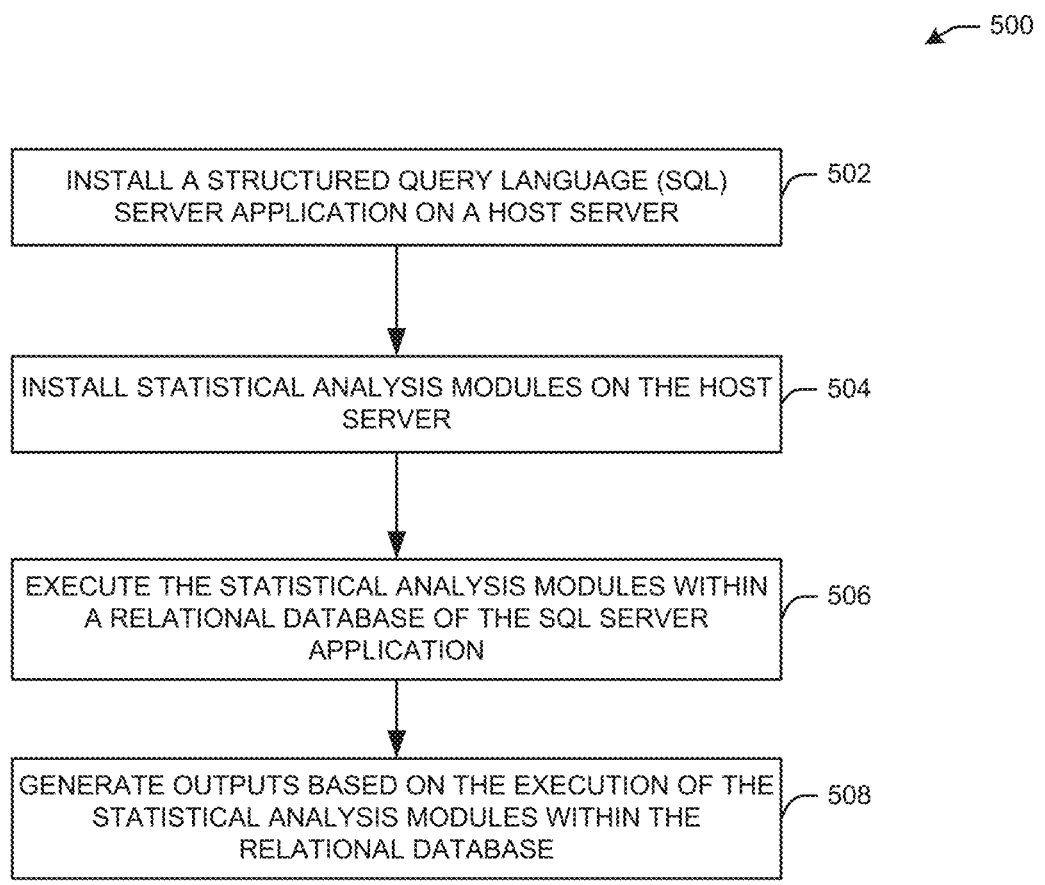
FIG. 5 is a flow for a process for processing large data volumes in relational databases in accordance with one embodiment.

FIG. 5 is a flow for a process 500 for processing large data volumes in relational databases in accordance with one embodiment.

At block 502, a device (e.g., the host server 102 of FIG. 1) may install a SQL server application (e.g., the SQL server application 104 of FIG. 1) on the device.

At block 504, the device may install statistical analysis modules (e.g., the statistical analysis modules 106 of FIG. 1) on the device.

At block 506, the device may execute the statistical analysis modules within a relational database (e.g., the one or more relational databases 108 of FIG. 1) of the SQL server application. The device may build a data mart using one or more relational databases, and the statistical analysis modules may run within the one or more relational databases to analyze the data in the data mart rather than extracting the data to be analyzed externally.

At block 508, the device may generate outputs based on the execution of the statistical analysis modules within the relational database.

It is understood that the above descriptions are for purposes of illustration and are not meant to be limiting.

Figure 6:
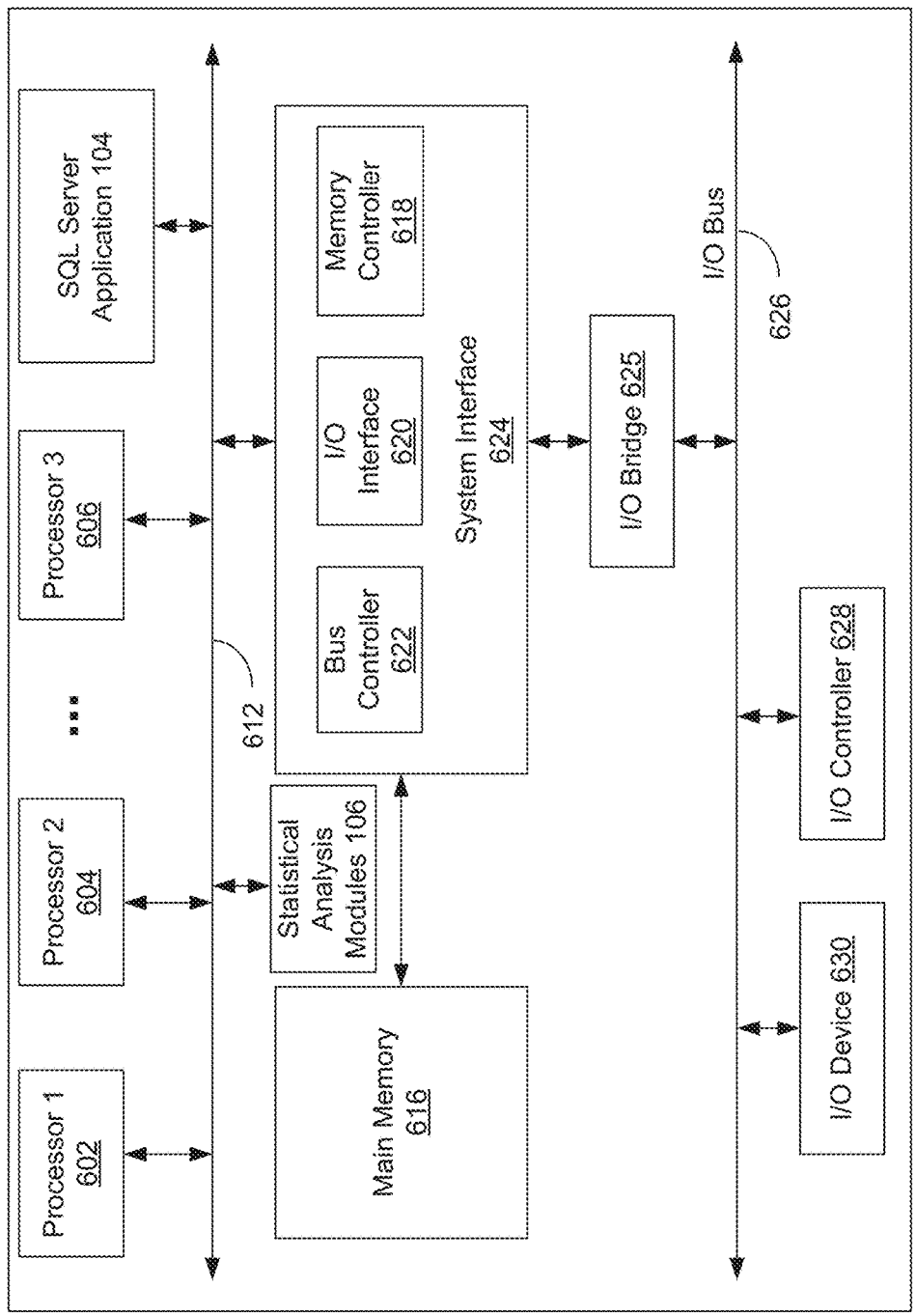
FIG. 6 is a diagram illustrating an example of a computing system that may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may represent at least a portion of the system 100 shown in FIG. 1, as discussed above. The computer system (system) includes one or more processors 602-606, the SQL server application 104 of FIG. 1, and the statistical analysis modules 106 of FIG. 1. Processors 602-606 may include one or more internal levels of cache (not shown) and a bus controller 622 or bus interface unit to direct interaction with the processor bus 612. Processor bus 612, also known as the host bus or the front side bus, may be used to couple the processors 602-606 with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for analyzing data stored in a relational database, the method comprising:
    installing a structured query language (SQL) server application on a host server;
    installing statistical analysis modules on the host server;
    executing the statistical analysis modules within a relational database of the SQL server application to analyze data stored in the relational database;
    generating outputs based on the execution of the statistical analysis modules within the relational database;
    generating a data mart in the SQL server application, the data mart comprising financial data, wherein the data comprises the financial data;
    generating a conceptual data model comprising independent specifications of the financial data;
    generating, based on the conceptual data model, a logical data model indicative of structures of the financial data to be implemented in the relational database; and
    generating, based on the logical data model, a physical data model in which the financial data are organized into tables, wherein generating the data mart is based on the tables.

2. The method of claim 1, wherein generating the outputs occurs without exporting the data stored in the relational database.

3. The method of claim 1, wherein the host server comprises 32 processing cores and 64 gigabytes of random access memory.

4. The method of claim 1, wherein the outputs comprise a spending trend and a forecast budget run rate.

5. The method of claim 1, wherein the statistical analysis modules use an R statistical model.

6. A system for analyzing data stored in a relational database, the system comprising memory coupled to at least one processor of a host server, the at least one processor configured to:
    install a structured query language (SQL) server application on the host server;
    install statistical analysis modules on the host server;
    execute the statistical analysis modules within a relational database of the SQL server application to analyze data stored in the relational database;
    generate outputs based on the execution of the statistical analysis modules within the relational database;
    generate a data mart in the SQL server application, the data mart comprising financial data, wherein the data comprises the financial data;
    generate a conceptual data model comprising independent specifications of the financial data;
    generate, based on the conceptual data model, a logical data model indicative of structures of the financial data to be implemented in the relational database; and
    generate, based on the logical data model, a physical data model in which the financial data are organized into tables, wherein generating the data mart is based on the tables.

7. The system of claim 6, wherein to generate the outputs occurs without exporting the data stored in the relational database.

8. The system of claim 6, wherein the host server comprises 32 processing cores and 64 gigabytes of random access memory.

9. The system of claim 6, wherein the outputs comprise a spending trend and a forecast budget run rate.

10. The system of claim 6, wherein the statistical analysis modules use an R statistical model.

11. A non-transitory computer-readable storage medium comprising instructions to cause at least one processor of a device for analyzing data stored in a relational database, upon execution of the instructions by the at least one processor, to:
    install a structured query language (SQL) server application on a host server;
    install statistical analysis modules on the host server;
    execute the statistical analysis modules within a relational database of the SQL server application to analyze data stored in the relational database;
    generate outputs based on the execution of the statistical analysis modules within the relational database;
    generate a data mart in the SQL server application, the data mart comprising financial data, wherein the data comprises the financial data;
    generate a conceptual data model comprising independent specifications of the financial data;
    generate, based on the conceptual data model, a logical data model indicative of structures of the financial data to be implemented in the relational database; and
    generate, based on the logical data model, a physical data model in which the financial data are organized into tables, wherein generating the data mart is based on the tables.

12. The non-transitory computer-readable storage medium of claim 11, wherein to generate the outputs occurs without exporting the data stored in the relational database.

13. The non-transitory computer-readable storage medium of claim 11, wherein the host server comprises 32 processing cores and 64 gigabytes of random access memory.

14. The non-transitory computer-readable storage medium of claim 11, wherein the outputs comprise a spending trend and a forecast budget run rate.

* * * * *